United States Patent
Saiyed (10) Patent No.: US 7,502,999 B1
(45) Date of Patent: Mar. 10, 2009

(54) AUTOMATICALLY EXPOSING COMMAND LINE INTERFACE COMMANDS AS WEB SERVICES

(75) Inventor: Junaid Saiyed, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1251 days.

(21) Appl. No.: 10/816,983

(22) Filed: Apr. 2, 2004

(51) Int. Cl.
*G06F 17/00* (2006.01)

(52) U.S. Cl. ............... 715/249; 715/236; 715/239; 715/205

(58) Field of Classification Search ............ 715/236, 715/210, 205, 249, 239; 709/223
See application file for complete search history.

(56) References Cited

U.S. PATENT DOCUMENTS

| | | | |
|---|---|---|---|
| 2002/0032790 A1* | 3/2002 | Linderman | 709/230 |
| 2002/0191619 A1* | 12/2002 | Shafer | 370/401 |
| 2003/0204644 A1* | 10/2003 | Vincent | 709/317 |
| 2004/0015564 A1* | 1/2004 | Williams | 709/219 |
| 2004/0237069 A1* | 11/2004 | Colgrave | 717/115 |

OTHER PUBLICATIONS

W3C, "SOAP Version 1.2 Part 0: Primer," W3C Recommendation, Jun. 24, 2003, http://www.w3.org/TR/2003/REC-soap12-part0-20030624/, data retrieved Jul. 9, 2004, pp. 1-48.
W3C, "SOAP Version 1.2 Part 1: Messaging Network," W3C Recommendation, Jun. 24, 2003, http://www.w3.org/TR/2003/REC-soap12-part1-20030624, data retrieved Jul. 9, 2004, pp. 1-49.
W3C, "SOAP Version 1.2 Part 2: Adjuncts," W3C Recommendation, Jun. 24, 2003, http://www.w3.org/TR/2003/REC-soap12-part2-20030624/, data retrieved Jul. 9, 2004, pp. 1-53.
W3C, "Web Services Description Language (WSDL) Version 2.0 Part 1: Core Language," W3C Working Draft, Mar. 26, 2004. http://www.w3.org/TR/wsdl20, data retrieved Jul. 9, 2004, pp. 1-83.

(Continued)

*Primary Examiner*—Stephen S Hong
*Assistant Examiner*—Adam M Queler
(74) *Attorney, Agent, or Firm*—Hickman Palermo Truong & Becker LLP; Christian A. Nicholes (57) ABSTRACT

A mechanism is disclosed for exposing a command line interface (CLI) command as a web service by automatically generating a description document that describes the CLI command's syntax. A man page that is associated with the specified CLI command is automatically parsed. Based on the man page, a description document is automatically generated. The automatically generated description document describes the CLI command's syntax.

21 Claims, 4 Drawing Sheets

OTHER PUBLICATIONS

W3C, "Web Services Description Language (WSDL) Version 2.0 Part 2: Message Exchange Patterns," W3C Working Draft, Mar. 26, 2004, http://www.w3.org/TR/wsdl20-patterns, data retrieved Jul. 9, 2004, pp. 1-9.

W3C, "Web Services Description Language (WSDL) Version 1.2 Part 3: Bindings," W3C Working Draft, Jun. 11, 2003, http://www.w3.org/TR/wsdl12-bindings/, data retrieved Jul. 9, 2004, pp. 1-35.

"Section 4: The UNIX Shell," http://www.isu.edu/departments/comcom/unix/workshop/shell.html, data retrieved Jul. 9, 2004, pp. 1-3.

Panagiotis Christias, "UNIX man pages: intro (1)," 1994, http://mirrors.ccs.neu.edu/cgi-bin/unixhelp/man-cgi?intro+1, data retrieved Jul. 9, 2004, pp. 1-79.

Dave Winer, XML-RPC.com, "XML-RPC Specification," Jun. 15, 1999, http://www.xmlrpc.com/spec, data retrieved Jul. 9, 2004, pp. 1-7.

Microsoft Corporation, "SOAP Toolkit," 2004, http://msdn.microsoft.com/webservices/building/soaptk/, data retrieved Jul. 9, 2004, pp. 1-2.

IBM, "WSDL4J Project: Summary," http://www-124.ibm.com/developerworks/projects/wsdl4j/, data retrieved Jul. 9, 2004, 1 page.

* cited by examiner

AUTOMATICALLY EXPOSING COMMAND LINE INTERFACE COMMANDS AS WEB SERVICES

BACKGROUND

An operating system (OS) may provide a multitude of useful functionality through a command line interface (CLI). Using a CLI, a user may enter a command to be performed by the OS. A command that can be entered at a CLI is referred to herein as a "CLI command". The CLI command may comprise a name, followed by options and/or parameters. Upon receiving a CLI command, the OS executes a program that matches the specified name. The OS passes, to the matching program, any options and parameters specified through the CLI. The program may perform actions relative to the OS. The program may generate output that the OS subsequently returns to the user.

For example, through a CLI, a user may enter a CLI command "ls-a". In response to the entry of the CLI command, the OS executes the "ls" program, and passes "a" as input to the "ls" program. In response to receiving the "a" option, the "ls" program customizes its output so that all entries in a directory, including those that begin with a dot, are included in the output generated by the "ls" program.

A user of a local OS might want to perform a CLI command relative to a remote OS. In this case, the user might remotely log-in to the remote OS using remote log-in functionality of the local OS (e.g., Telnet). Once the user has remotely logged-in to the remote OS, the user can enter CLI commands through the remote OS's CLI.

In response to such CLI commands, matching programs resident in the remote OS's file system are executed rather than matching programs resident in the local OS's file system. Results returned by programs resident in the remote OS's file system might pertain specifically to the remote OS. For example, because the contents of the remote OS's file system may differ from the contents of the local OS's file system, the "ls" program resident in the remote OS's file system may generate different output than the "ls" program resident in the local OS's file system.

Often, a user might want CLI commands to be performed relative to a significantly large number of separate remote OSs. Using the approach described above, the user would need to separately log-in to each such remote OS, and enter the CLI commands separately in each such remote OS'CLI. When the number of such remote OSs is very large, this approach can consume an excessive amount of the user's time.

SUMMARY

In accordance with one embodiment of the present invention, a mechanism is disclosed for exposing CLI commands as web services. By doing so, it is possible to invoke CLI commands on a remote OS without requiring a user to formally log-in to the remote OS and enter the CLI command into the CLI of that remote OS.

In one embodiment, the CLI command's syntax, which describes the CLI command's name, options, and formal parameters, is expressed in a service description language (e.g., Web Services Description Language (WSDL)). The service description language expression of the CLI command's syntax may then be used to construct a remote invocation message (e.g., a Simple Object Access Protocol (SOAP) message). The remote invocation message represents an invocation of the CLI command. The remote invocation message may be conveyed to a remote system, which may carry out the invocation represented in the remove invocation message. Because the remote invocation message may be conveyed to the remote system via a well-known protocol (e.g., Hypertext Transfer Protocol (HTTP) or Simple Message Transfer Protocol (SMTP)), a user or application can cause the CLI command to be executed on the remote system without formally logging-in to the remote system.

In accordance with one embodiment of the present invention, a mechanism is disclosed for automatically expressing a CLI command's syntax in a service description language (e.g., WSDL) based on an OS-provided man page that corresponds to the CLI command. The man page that is associated with the specified CLI command is automatically parsed. Based on the man page, a description document (e.g., a WSDL document) is automatically generated. The automatically generated description document describes the CLI command's syntax. The description document may made accessible to remote systems to enable those remote systems to create remote invocation messages.

DETAILED DESCRIPTION OF EMBODIMENT(S)

Overview

Figure 1:
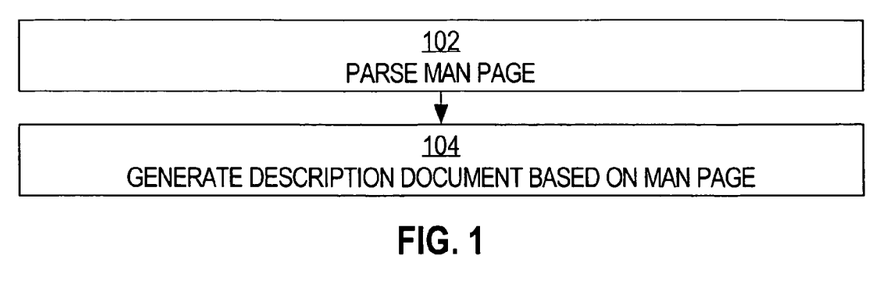
FIG. 1 depicts an overview of an operational flow for automatically generating a description document that describes a CLI command's syntax, in accordance with one embodiment of the present invention.

FIG. 1 depicts an overview of an operational flow for automatically generating a description document that describes a CLI command's syntax, in accordance with one embodiment of the present invention. In block 102, a man page (short for "manual page"), which is associated with the CLI command, is parsed. In block 104, based on the man page, a description document (e.g., a WSDL document) is automatically generated. The description document describes the CLI command's syntax.

Once the description document has been generated for the CLI command, the description document may be used to generate a remote invocation message (e.g., a SOAP message) that represents an invocation of the CLI command. The remote invocation message may be conveyed to a remote system via a well-known protocol (e.g., HTTP or SMTP). The remote system may execute the CLI command based on the information contained in the remote invocation message. In this manner, it is possible to invoke a CLI command on a remote OS without requiring a user to log in to the remote OS and enter the CLI command.

An embodiment of the invention is described below with reference to UNIX. However, references to UNIX are for illustrative purposes only. The concepts discussed below may be applied to any OS that provides a CLI.

Parsing A Man Page

Typically, a UNIX-based OS provides a separate man page for each CLI command provided by the OS. Other OSs also may provide man pages. For example, an OS may provide a man page for the "ls" CLI command. A man page for a particular CLI command contains text that describes the syntax of the particular CLI command. A particular CLI command's man page typically indicates the name of the particular CLI command, a directory path to a program that implements the particular CLI command, any options that may be specified in association with the particular CLI command, and any formal parameters that may be specified in association with the particular CLI command. Each man page conforms to a well-known format.

Each man page typically comprises, among other lines of text, a line that contains the text "NAME", and a line that contains the text "SYNOPSIS". Following the "NAME" line, and preceding the "SYNOPSIS" line, is a line that begins with the name of a CLI command. Following the "SYNOPSIS" line are one or more lines that each begin with a directory path to a program that implements the CLI command, possibly followed by a string of options characters enclosed within brackets, possibly followed by one or more formal parameters, each of which is also enclosed within brackets. One or more whitespace characters typically separate the directory path, the string of options characters, and each of the formal parameters.

For example, the first few lines of the man page for the "ls" CLI command might be as follows:

NAME ls—list contents of directory

SYNOPSIS

/usr/bin/ls [-ad] [file . . . ]

In this example, the directory path to the program that implements the "ls" CLI command is "/usr/bin/ls" and the string of options characters comprises two different options: "a" and "d". A hyphen character typically precedes the string of options characters, and is not an option itself. Although only one formal parameter ("file . . . ") follows the string of options characters, the presence of ellipses within the brackets surrounding the formal parameter indicates that multiple instances of that formal parameter may follow the string of options characters.

Because each man page conforms to such a well-known format, a computer program may be designed to automatically parse the man page and generate, based on the man page, a description document (e.g., a WSDL document) that describes the syntax of the man page's subject CLI command. For example, such a program might accept, as input, a CLI command. The program might locate a man page that is associated with the CLI command by finding, in a directory that typically contains man page files, a file that has the same name as the CLI command. The program might parse the man page to find the name of the CLI command, the directory path associated with the CLI command, any options that could be specified in association with the CLI command, and any formal parameters that could be specified in association with the CLI command. The program might generate and output a description document that contains description document elements (e.g., WSDL elements) that correspond to the name, the directory path, the options, and/or the formal parameters found in the man page. Because man page files are typically contained in a well-known directory, the program does not need to be supplied with the location of the man pages.

Figure 2:
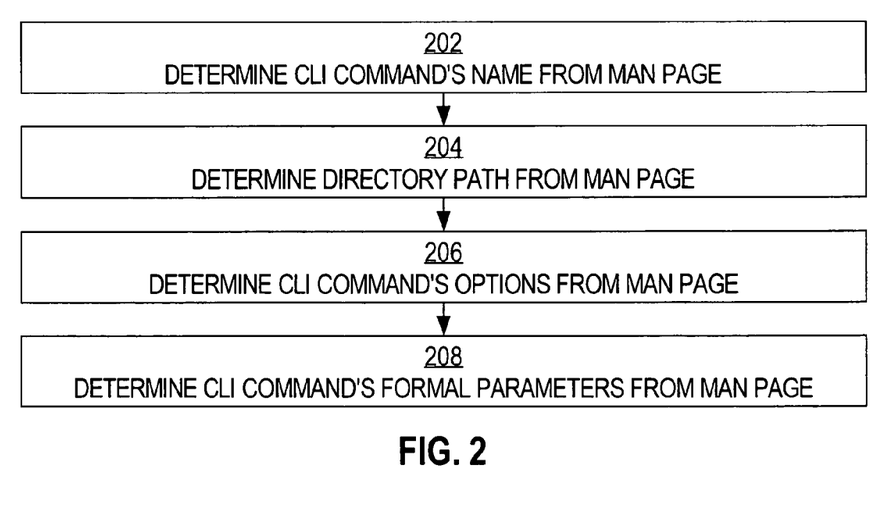
FIG. 2 depicts an operational flow for parsing a man page, in accordance with one embodiment of the present invention.

FIG. 2 depicts an operational flow for parsing a man page, in accordance with one embodiment of the present invention. In block 202, a name of a CLI command is determined from the man page. For example, a program might locate the first non-whitespace character following the "NAME" line in the man page. The program may take all of the characters from that point until the next whitespace character to be the name of the CLI command.

In block 204, a directory path of a program that implements the CLI command is determined from the man page. Continuing the example, the program might locate the first non-whitespace character following the "SYNOPSIS" line in the man page. The program may take all of the characters from that point until the next whitespace character to be the directory path of a program that implements the CLI command.

In block 206, one or more options that may be specified in association with the CLI command are determined from the man page. Continuing the example, the program might locate the first open-bracket character and hyphen character pair ("[-") that follows the directory path on the same line of the man page. The program might then locate the first closing-bracket character that follows the open-bracket character. The program may take each of the characters between the open-bracket character and the closing-bracket character, except for hyphen characters, to be separate options. The program may take the absence of an open-bracket character and hyphen character pair to mean that no options may be specified in association with the CLI command.

In block 208, one or more formal parameters that may be specified in association with the CLI command are determined from the man page. Continuing the example, the program might locate, after but on the same line as the directory path in the man page, the first non-whitespace character that is not immediately followed by a hyphen character. This character is referred to below as the starting character. The program might then locate the next whitespace character that follows the starting character. This character is referred to below as the ending character. The program may take the string starting at the starting character and ending with the character preceding the ending character, excluding any bracket characters, to be a formal parameter. The program might then locate any other whitespace-surrounded strings that occur subsequently on the same line of the man page. The program may take each such string to be a separate formal parameter.

Based on the information determined from the man page, the program may automatically generate a description document (e.g., a WSDL document) that describes the syntax of the CLI command. Once the description document has been generated, the description document may be used to generate a remote invocation message (e.g., a SOAP message) that represents an invocation of the CLI command. A technique for automatically generating such a description document is described below.

Automatically Generating a Description Document

Figure 3:
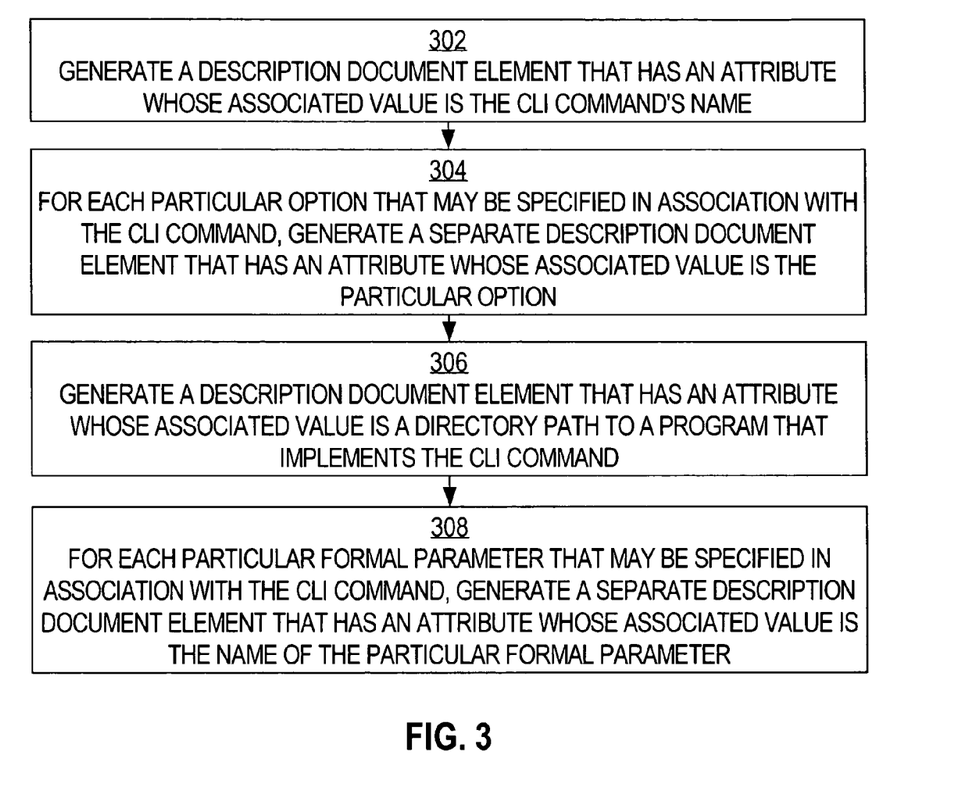
FIG. 3 depicts an operational flow for automatically generating a description document that describes a CLI command's syntax, in accordance with one embodiment of the present invention.

FIG. 3 depicts an operational flow for automatically generating a description document that describes a CLI command's syntax, in accordance with one embodiment of the present invention. The description document (e.g., a WSDL document) is automatically generated based on information obtained by parsing a man page that corresponds to the CLI command. For purposes of the discussion herein, knowledge of WSDL and SOAP, both of which are well known and defined, is assumed. However, WSDL and SOAP are only examples of a service description language and a remote invocation protocol, respectively, that may be used to implement a particular embodiment of the invention.

In block 302, a description document element (e.g., a WSDL element), which has a name attribute whose associated value is the name of the CLI command, is automatically generated. For example, if a program has determined that the CLI command's name is "ls", then the program might place, in a WSDL document, WSDL "message" and "portType" elements such as:

```
<message name="executeLS">
<part name="ls" type="xsd:string"/>
</message>
<portType name="commandExecution">
<operation name="executeLS">
   <input message="executeLS"/>
</operation>
</portType>
```

In this example, the "message" element has a "name" attribute whose value, "executeLS", contains the name of the CLI command, "ls". The "message" element has a child element, "part", which also has an attribute "name", whose value is the name of the CLI command, "ls". The "portType" element has a child element, "operation", which also has an attribute "name", whose value, "executeLS", contains the name of the CLI command, "ls".

In block 304, for each particular option that may be specified in association with the CLI command, a separate description document element, which has a name attribute whose associated value is the name of the particular option, is automatically generated. Continuing the example, if the program has determined that the options that can be specified in association with the CLI command are "a" and "d", then the program might place, in the WSDL document, a WSDL "types" element having child elements such as follows:

```
<types>
<xsd:schema     xmlns:xsd="http://www.w3.org/2001/
   XMLSchema">
   <xsd:simpleType name="a" maxOccurs="1" minOc-
      curs="0"
      type="xsd:string">
   <xsd:simpleType name="d" maxOccurs="1" minOc-
      curs="0"
      type="xsd:string">
</xsd:schema>
</types>
```

In this example, the "types" element has an "xsd:schema" child element, which has two "xsd:simpleType" child elements of its own; one for each option that may be specified in association with the "ls" CLI command. The first "xsd:simpleType" element has a "name" attribute whose value is the first option, "a". The second "xsd:simpleType" element also has a "name" attribute, whose value is the second option, "d". The maxOccurs and minOccurs attributes for each "xsd:simpleType" element have values of "1" and "0", respectively, indicating that each option may be specified in association with the "ls" CLI command either once or not at all.

In block 306, a description document element, which has a name attribute whose associated value is a directory path to a program that implements the CLI command, is automatically generated. Continuing the example, if the WSDL-generating program has determined that the directory path to the program that implements the "is" CLI command is "/usr/bin/ls", then the WSDL-generating program might place, in the WSDL document, an element having a "name" attribute whose value is "/usr/bin/ls".

In block 308, for each particular formal parameter that may be specified in association with the CLI command, a separate description document element, which has a name attribute whose associated value is the name of the particular formal parameter, is automatically generated. Continuing the example, if the program has determined that a formal parameter that can be specified in association with the CLI command is "file", then the program might place, in the WSDL document, an element having a "name" attribute whose value is "file". The element may have maxOccurs and minOccurs attributes that indicate a minimum and maximum number of time, respectively, that the formal parameter may be specified in association with the CLI command. If a formal parameter is mandatory, then the minOccurs attribute for the corresponding element will be at least "1". Alternatively, if the formal parameter is merely optional, then the minOccurs attribute for the corresponding element will be "0".

In embodiments where the description document is a WSDL document, the description document-generating program may also place, in the WSDL document, a WSDL "binding" element that specifies that the SOAP protocol is to be used. The WSDL-generating program may also place, in the WSDL document, a "soap:binding" element having a "style" attribute whose associated value is "rpc". The WSDL-generating program may also place other elements, not expressly enumerated herein, in the WSDL document, based on information gathered from the CLI command's corresponding man page.

Once all of the elements of the description document have been generated, the description document-generating program may store the description document at a specified location, and with a specified name. For example, if the CLI command is "ls", then the description document may be named "ls.wsdl". The description document may be made accessible to remote systems, such as by registering the description document with a UDDI registry, for example, so that other parties can access and use the interface defined by the description document.

Therefore, for example, a portion of an automatically-generated WSDL document for an "ls" CLI command that has only two possible options, "a" and "d", might look like this:

```
<?xml version="1.0" encoding="UTF-8"?>
<definitions
name="ls"
targetNamespace="http://localhost/ls.wsdl"
xmlns="http://schemas.xmlsoap.org/wsdl">
<types>
<xsd:schema     xmlns:xsd="http://www.w3.org/2001/
   XMLSchema">
   <xsd:simpleType name="a" maxOccurs="1" minOc-
      curs="0"
      type="xsd:string">
   <xsd:simpleType name="d" maxOccurs="1" minOc-
      curs="0"
      type="xsd:string">
</xsd:schema>
</types>
<message name="executeLS">
<part name="ls" type="xsd:string"/>
</message>
<portType name="commandExecution">
```

```
<operation name="executeLS">
    <input message="executeLS"/>
</operation>
</portType>
```

Remotely Executing A CLI Command

Once the description document has been automatically generated, the description document may be made accessible to remote systems to enable those remote systems to create remote invocation messages. For example, the description document may be registered with a UDDI registry. Other parties, who wish to remotely execute the CLI command whose syntax is described by the description document, may query the UDDI registry in order to find and obtain the description document.

Using the description document, a remote invocation request message (e.g., a SOAP request message) may be generated. Techniques for generating a SOAP message based on a WSDL document are well known and are not described in detail herein. The remote invocation request message may represent an invocation of the CLI command expressed in Extensible Markup Language (XML), for example. A program that generates the remote invocation request message may use the description document to determine which actual parameters need to be specified in the remote invocation request message. Once the remote invocation request message has been generated, a client device may transmit the remote invocation request message to a server device using a protocol such as HTTP or SMTP. The client device and the server device may be, for example, general-purpose computers.

A server device that receives such a remote invocation request message may execute a program that decodes remote invocation messages and carries out remote procedure calls (RPCs) represented therein. Resident on the server device are programs that implement CLI commands whose invocations may be represented by remote invocation request messages—such programs normally are provided by the server device's OS. Therefore, when the server device receives a remote invocation request message that represents an invocation of the "ls" CLI command, for example, the server device executes a program that implements the "ls" CLI command (the "implementing program"). Any options and parameters specified in the remote invocation request message are passed as input to the implementing program.

The server device may take output produced by the implementing program and place that output in a remote invocation response message (e.g., a SOAP response message). The server device may transmit the remote invocation response message to the client device using a protocol such as HTTP or SMTP. The client device may decode the remote invocation response message and use the information contained therein. For example, in response to a SOAP request message that represents an invocation of the "ls" command, a server device may generate a SOAP response message that contains output from the server device's "ls" implementing program, and send that SOAP response message to the client device. The contents of the SOAP response message may indicate the contents of a directory in the server device's file system. Thus, a client device may execute the "ls" command, and other CLI commands, on a server device without formally logging-in to the server device beforehand. Therefore, the CLI commands are exposed as web services.

Figure 4:
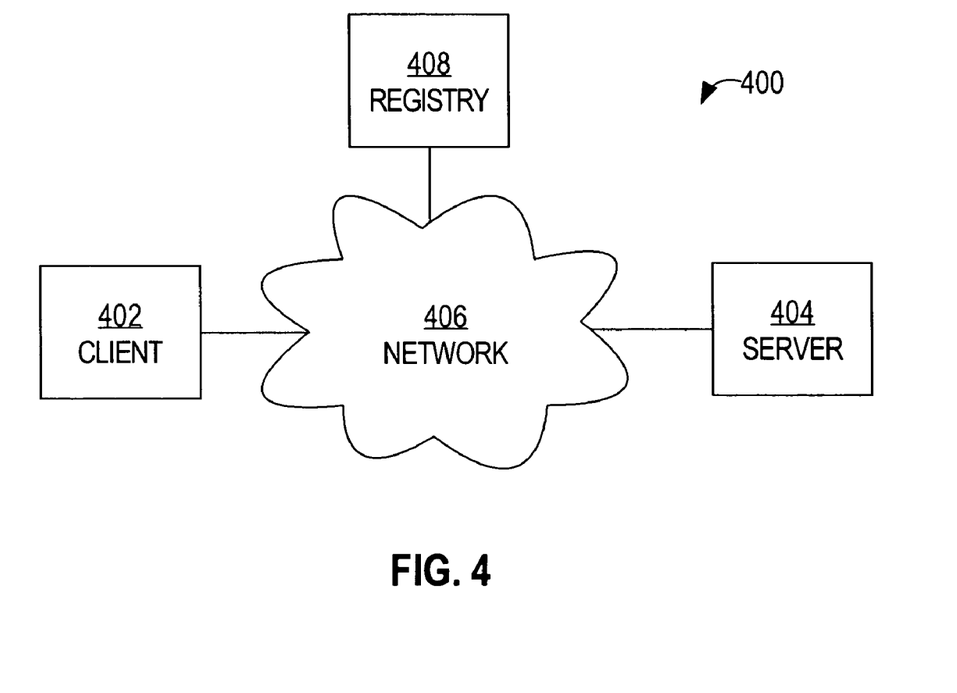
FIG. 4 is a block diagram that illustrates a client-server system in which a CLI command is exposed as a web service of a service device.

FIG. 4 is a block diagram that illustrates a client-server system 400 in which a CLI command is exposed as a web service of a service device. System 400 includes client device 402, server device 404, network 406, and registry 408. Client device 402, server device 404, and registry 408 may all communicate with each other by sending messages through network 406. Network 406 may be a local area network (LAN), a wide area network (WAN), or an inter-network such as the Internet. Such messages may be sent using HTTP or SMTP, for example.

Server device 404 generates a description document based on a man page as described above. Server device 404 then makes that description document accessible to client device 402. For example, server device 404 may make the description document available by registering the description document with registry 408. Server device 404 may store the description document itself in registry 408, or record in registry 408 where the description document is located so that other parties can obtain the description document.

Client device 402 may request, from registry 408, either the description document itself or information on where the description document can be found. Either way, client device 402 obtains the description document.

Based on the description document, client device 402 generates a remote invocation message and sends the remote invocation message to server device 404. Service device 404 receives the remote invocation message and executes the CLI command specified therein using the actual parameters and options specified therein. Service device 404 may return any results to client device 402.

Hardware Overview

Figure 5:
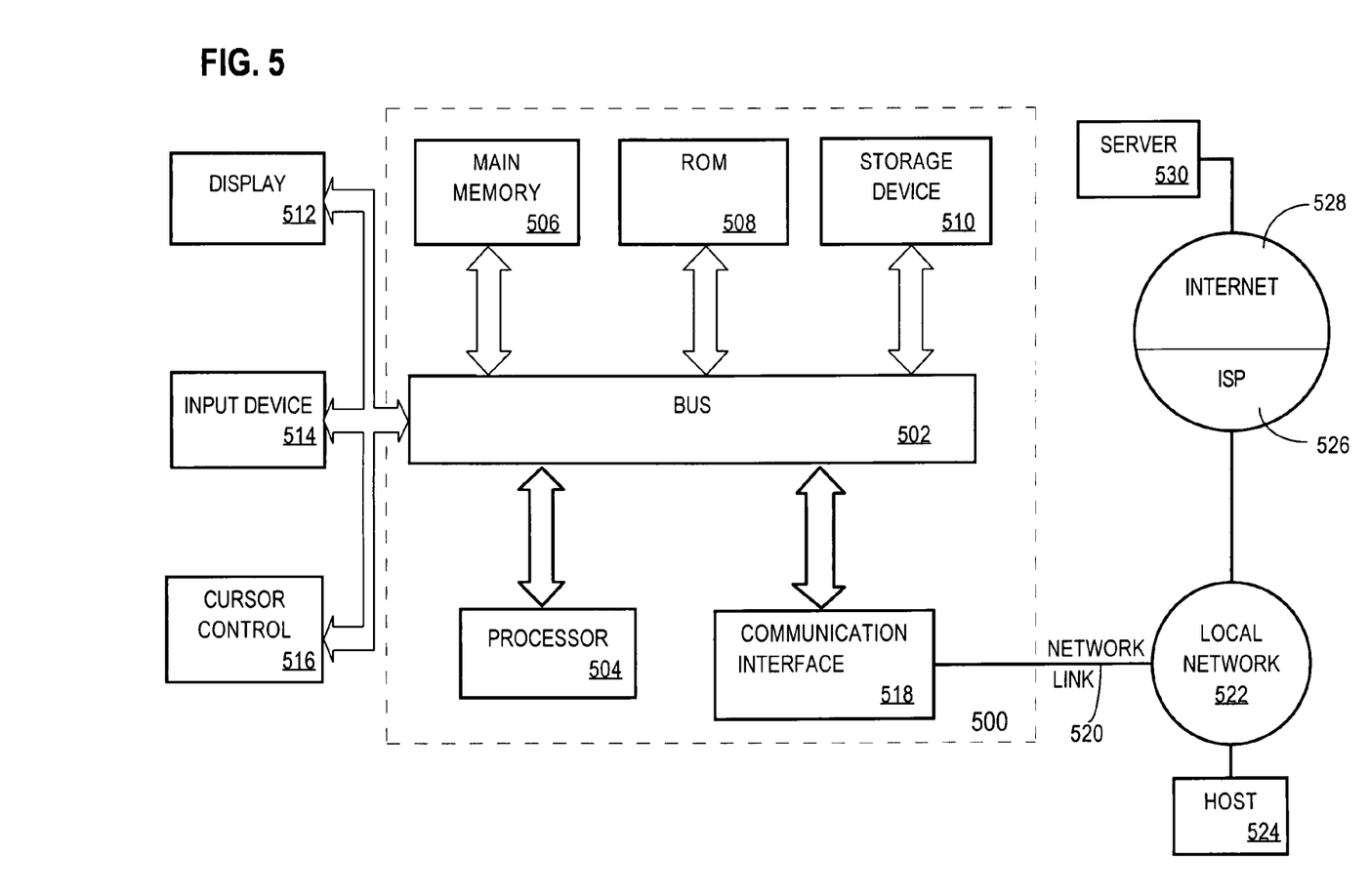
FIG. 5 is a hardware block diagram of a sample computer system, upon which one or more components of an embodiment of the present invention may be implemented.

FIG. 5 is a block diagram that illustrates a computer system 500 upon which an embodiment of the invention may be implemented. Computer system 500 includes a bus 502 for facilitating information exchange, and one or more processors 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by processor 504. Computer system 500 may further include a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In computer system 500, bus 502 may be any mechanism and/or medium that enables information, signals, data, etc., to be exchanged between the various components. For example, bus 502 may be a set of conductors that carries electrical signals. Bus 502 may also be a wireless medium (e.g. air) that carries wireless signals between one or more of the components. Bus 502 may also be a medium (e.g. air) that enables signals to be capacitively exchanged between one or more of the components. Bus 502 may further be a network connection that connects one or more of the components. Overall, any mechanism and/or medium that enables information, signals, data, etc., to be exchanged between the various components may be used as bus 502.

Bus 502 may also be a combination of these mechanisms/media. For example, processor 504 may communicate with storage device 510 wirelessly. In such a case, the bus 502, from the standpoint of processor 504 and storage device 510, would be a wireless medium, such as air. Further, processor 504 may communicate with ROM 508 capacitively. In this instance, the bus 502 would be the medium (such as air) that enables this capacitive communication to take place. Further, processor 504 may communicate with main memory 506 via a network connection. In this case, the bus 502 would be the network connection. Further, processor 504 may communicate with display 512 via a set of conductors. In this instance, the bus 502 would be the set of conductors. Thus, depending upon how the various components communicate with each other, bus 502 may take on different forms. Bus 502, as shown in FIG. 5, functionally represents all of the mechanisms and/or media that enable information, signals, data, etc., to be exchanged between the various components.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising:

parsing a man page that is associated with a specified command line interface (CLI) command;

based on the man page, automatically generating a description document that describes the syntax of the specified CLI command;

making the description document accessible to one or more remote systems to enable the one or more remote systems to create remote invocation messages based on the description document; receiving a remote invocation message that represents an invocation of the specified CLI command, wherein the remote invocation message was generated by at least one of the one or more remote systems based on the description document; and executing the CLI command indicated in the remote invocation message.

2. The method of claim 1, wherein the description document is a Web Services Description Language (WSDL) document.

3. The method of claim 1, wherein:

parsing the man page comprises determining, from the man page, a name of the specified command; and automatically generating the description document comprises generating a portion of the description document that contains the name of the specified command as indicated by the man page.

4. The method of claim 1, wherein:

parsing the man page comprises determining, from the man page, one or more options that may be specified in association with the specified command; and automatically generating the description document comprises generating, for each particular option of the one or more options, a separate portion of the description document that indicates the particular option.

5. The method of claim 1, wherein:

parsing the man page comprises determining, from the man page, a directory path to a program that implements the specified command; and automatically generating the description document comprises generating a portion of the description document that indicates the directory path.

6. The method of claim 1, wherein:

parsing the man page comprises determining, from the man page, one or more formal parameters that may be specified in association with the specified command; and automatically generating the description document comprises generating, for each particular formal parameter of the one or more formal parameters, a separate portion of the description document that indicates the particular formal parameter.

7. The method of claim 1, wherein the remote invocation message is a Simple Object Access Protocol (SOAP) message.

8. A volatile or non-volatile machine-readable storage medium, comprising:

instructions for causing one or more processors to parse a man page that is associated with a specified command line interface (CLI) command;

instructions for causing one or more processors to automatically generate, based on the man page, a description document that describes the syntax of the specified CLI command;

instructions for causing one or more processors to make the description document accessible to one or more remote systems to enable the one or more remote systems to create remote invocation messages based on the description document; instructions for causing one or more processors to receive a remote invocation message that represents an invocation of the specified CLI command, wherein the remote invocation message was generated by at least one of the one or more remote systems based on the description document; and instructions for causing one or more processors to execute the CLI command indicated in the remote invocation message.

9. The machine-readable medium of claim 8, wherein the description document is a Web Services Description Language (WSDL) document.

10. The machine-readable medium of claim 8, wherein:

the instructions for causing one or more processors to parse the man page comprise instructions for causing one or more processors to determine, from the man page, a name of the specified command; and the instructions for causing one or more processors to automatically generate the description document comprise instructions for causing one or more processors to generate a portion of the description document that contains the name of the specified command as indicated by the man page.

11. The machine-readable medium of claim 8, wherein:

the instructions for causing one or more processors to parse the man page comprise instructions for causing one or more processors to determine, from the man page, one or more options that may be specified in association with the specified command; and the instructions for causing one or more processors to automatically generate the description document comprise instructions for causing one or more processors to generate, for each particular option of the one or more options, a separate portion of the description document that indicates the particular option.

12. The machine-readable medium of claim 8, wherein:

the instructions for causing one or more processors to parse the man page comprise instructions for causing one or more processors to determine, from the man page, a directory path to a program that implements the specified command; and the instructions for causing one or more processors to automatically generate the description document comprise instructions for causing one or more processors to generate a portion of the description document that indicates the directory path.

13. The machine-readable medium of claim 8, wherein:

the instructions for causing one or more processors to parse the man page comprise instructions for causing one or more processors to determine, from the man page, one or more formal parameters that may be specified in association with the specified command; and the instructions for causing one or more processors to automatically generate the description document comprise instructions for causing one or more processors to generate, for each particular formal parameter of the one or more formal parameters, a separate portion of the description document that indicates the particular formal parameter.

14. The machine-readable medium of claim 8, wherein the remote invocation message is a Simple Object Access Protocol (SOAP) message.

15. An apparatus, comprising: one or more microprocessors;

a mechanism for parsing a man page that is associated with a specified command line interface (CLI) command;

a mechanism for automatically generating, based on the man page, a description document that describes the syntax of the specified CLI command;

a mechanism for making the description document accessible to one or more remote systems to enable the one or more remote systems to create remote invocation messages based on the description document; a mechanism for receiving a remote invocation message that represents an invocation of the specified CLI command, wherein the remote invocation message was generated by at least one of the one or more remote systems based on the description document; and a mechanism for executing the CLI command indicated in the remote invocation message.

16. The apparatus of claim 15, wherein the description document is a Web Services Description Language (WSDL) document.

17. The apparatus of claim 15, wherein:

the mechanism for parsing the man page comprises a mechanism for determining, from the man page, a name of the specified command; and the mechanism for automatically generating the description document comprises a mechanism for generating a portion of the description document that contains the name of the specified command as indicated by the man page.

18. The apparatus of claim 15, wherein:

the mechanism for parsing the man page comprises a mechanism for determining, from the man page, one or more options that may be specified in association with the specified command; and the mechanism for automatically generating the description document comprises a mechanism for generating, for each particular option of the one or more options, a separate portion of the description document that indicates the particular option.

19. The apparatus of claim 15, wherein:

the mechanism for parsing the man page comprises a mechanism for determining, from the man page, a directory path to a program that implements the specified command; and the mechanism for automatically generating the description document comprises a mechanism for generating a portion of the description document that indicates the directory path.

20. The apparatus of claim 15, wherein:

the mechanism for parsing the man page comprises a mechanism for determining, from the man page, one or more formal parameters that may be specified in association with the specified command; and the mechanism for automatically generating the description document comprises a mechanism for generating, for each particular formal parameter of the one or more formal parameters, a separate portion of the description document that indicates the particular formal parameter.

21. The apparatus of claim 15, wherein the remote invocation message is a Simple Object Access Protocol (SOAP) message.

* * * * *